US012812630B2

(12) United States Patent
He

(10) Patent No.: US 12,812,630 B2
(45) Date of Patent: Nov. 24, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 304 days.

(21) Appl. No.: 18/243,483

(22) Filed: Sep. 7, 2023

(65) Prior Publication Data

US 2023/0422240 A1 Dec. 28, 2023

Related U.S. Application Data

(63) Continuation of application No. PCT/CN2021/096898, filed on May 28, 2021.

(51) Int. Cl.
*H04W 72/12* (2023.01)
*H04W 72/0446* (2023.01)
(Continued)

(52) U.S. Cl.
CPC ... *H04W 72/1268* (2013.01); *H04W 72/0446* (2013.01); *H04W 72/232* (2023.01); *H04W 74/0833* (2013.01)

(58) Field of Classification Search
CPC ........... H04W 72/1268; H04W 72/232; H04W 72/0446; H04W 74/0833
See application file for complete search history.

(56) References Cited

U.S. PATENT DOCUMENTS 11,871,489 B2 * 1/2024 Lewis .................... H05B 45/22
2017/0273113 A1 9/2017 Tirronen
(Continued)

FOREIGN PATENT DOCUMENTS

CN 108029119 A 5/2018
CN 111092695 A 5/2020
(Continued)

OTHER PUBLICATIONS

Moderator (ZTE Corporation): Final feature lead summary on support of Type A PUSCH repetitions for Msg3), May 27, 2021. (Year: 2021).*
(Continued)

*Primary Examiner* — Brenda H Pham
(74) *Attorney, Agent, or Firm* — BAYES PLLC

(57) ABSTRACT

Provided are a wireless communication method, a terminal device, and a network device. The method includes: the terminal device receives a random access response (RAR) sent by the network device, wherein the RAR includes at least one first bit, the at least one first bit may be used for indicating the number of repeated transmissions of a physical uplink shared channel (PUSCH), and the PUSCH is used for carrying a third message in a random access process; and the terminal device determines, according to first information, whether the at least one first bit indicates the number of repeated transmissions of the PUSCH, wherein the first information is associated with the RAR.

19 Claims, 9 Drawing Sheets

(51) Int. Cl.

| | |
|---|---|
| ***H04W 72/1268*** | (2023.01) |
| ***H04W 72/232*** | (2023.01) |
| ***H04W 74/0833*** | (2024.01) |

(56) References Cited

U.S. PATENT DOCUMENTS

| | | | | |
|---|---|---|---|---|
| 2020/0120709 | A1* | 4/2020 | Bergquist | H04W 74/02 |
| 2020/0260497 | A1* | 8/2020 | Ozturk | H04W 16/14 |
| 2020/0329508 | A1 | 10/2020 | Tirronen | |
| 2021/0076384 | A1 | 3/2021 | Molavianjazi | |
| 2022/0232639 | A1 | 7/2022 | Wang | |
| 2024/0049292 | A1* | 2/2024 | Liu | H04L 1/0003 |

FOREIGN PATENT DOCUMENTS

| | | | |
|---|---|---|---|
| CN | 111865501 | A | 10/2020 |
| CN | 114765896 | A | 7/2022 |
| WO | 2022152242 | A1 | 7/2022 |

OTHER PUBLICATIONS

International Search Report in the international application No. PCT/CN2021/096898, mailed on Feb. 24, 2022. 5 pages with English translation.
Written Opinion of the International Search Authority in the international application No. PCT/CN2021/096898, mailed on Feb. 24, 2022. 8 pages with English translation.
3GPP TSG RAN WG1 #97 R1-1906846, Reno, USA, May 13-17, 2019, Agenda Item: 6.2.1.5, Source: Sony, Title: Considerations in the support of quality report in Msg3, Document for: Discussion / decision. The whole document. 3 pages.
3GPP TS 38.213 V16.2.0 (Jun. 2020), 3rd Generation Partnership Project; Technical Specification Group Radio Access Network; NR; Physical layer procedures for control (Release 16). Section 8.2. 176 pages.
3GPP Ts 38.214 V16.2.0 (Jun. 2020), 3rd Generation Partnership Project; Technical Specification Group Radio Access Network; NR; Physical layer procedures for data (Release 16). Section 6.1. 163 pages.
Moderator (ZTE Corporation): "Final feature lead summary on support of Type A PUSCH repetitions for Msg3", 3GPP Draft; R1-2106247, 3rd Generation Partnership Project (3GPP), Mobile Competence Centre; 650, Route Des Lucioles; F-06921 Sophia-Antipolis Cedex; France, vol. RAN WG1, No. e-Meeting; May 10, 2021-May 27, 2021, May 27, 2021 (May 27, 2021), XP052015768, section 2.2. 84 pages.
Nokia et al: "Approaches and solutions for Type A PUSCH repetitions for Msg3", 3GPP Draft; R1-2105905, 3rd Generation Partnership Project (3GPP), Mobile Competence Centre; 650, Route Des Lucioles; F-06921 Sophia-Antipolis Cedex; France, vol. RAN WG1, No. e-Meeting; May 19, 2021-May 27, 2021, May 11, 2021 (May 11, 2021), XP052006494, section 2, 2.1, 2.5, 2.6. 17 pages.
VIVO: "Discussion on Type A PUSCH repetition for Msg3", 3GPP Draft; R1-2100461, 3rd Generation Partnership Project (3GPP), Mobilecompetence Centre; 650, Route Des Lucioles; F-06921 Sophia-Antipolis Cedex; France, vol. RAN WG1, No. e-Meeting; Jan. 25, 2021-Feb. 5, 2021, Jan. 18, 2021 (Jan. 18, 2021), XP051970383, section 2.4. 7 pages.
Supplementary European Search Report in the European application No. 21942398.5, mailed on Feb. 6, 2024. 14 pages.
First Office Action of the European application No. 21942398.5, issued on Sep. 18, 2024, 7 pages.
Supplementary European Search Report in the European application No. 25189417.6, mailed on Sep. 30, 2025.
First Office Action of the European application No. 25189417.6, issued on Mar. 31, 2026.
First Office Action of the Chinese application No. 202411483828.7, issued on Aug. 22, 2026.
Second Office Action of the European application No. 25189417.6, issued on Oct. 15, 2026.

* cited by examiner

WIRELESS COMMUNICATION METHOD, TERMINAL DEVICE, AND NETWORK DEVICE

CROSS-REFERENCE TO RELATED APPLICATION

This application is a continuation of International Patent Application No. PCT/CN2021/096898 filed on May 28, 2021, which is incorporated herein by reference in its entirety.

BACKGROUND

In a New Radio (NR) system, four-step random access procedure may be supported, which includes transmission of a message 1 (Msg1), a message 2 (Msg2), a message 3 (Msg3), and a message 4 (Msg4). The Msg3 is carried by a Physical Uplink Shared Channel (PUSCH). Uplink (UL) grant of a PUSCH used for initial transmission of the Msg3 is carried by a Random Access Response (RAR) in the Msg2.

In some scenarios, reliability of uplink transmission may be improved by repeatedly transmitting the PUSCH carrying the Msg3. A number of repetitions of the PUSCH carrying the Msg3 may be indicated by multiplexing information domain in the RAR. In some cases, a User Equipment (UE) may request repetitions of the PUSCH carrying the Msg3 from a network device. The network device may decide whether to schedule the repetitions of the PUSCH carrying the Msg3. In this case, an urgent problem to be solved is how the UE can interpret the information field in the RAR that is multiplexed to indicate the number of repetitions of the PUSCH so as to ensure that the network device and the UE have the same understanding of the transmission mode of the PUSCH carrying the Msg3.

SUMMARY

Embodiments of the disclosure relate to the field of communication, and particularly to a method for radio communication, a User Equipment, and a network device. The disclosure provides a method for radio communication, a UE, and a network device. The UE may determine, according to first information associated with an RAR, whether at least one first bit in the RAR indicates information on a number of repetitions of a PUSCH carrying the Msg3.

In a first aspect, a method for radio communication is provided. The method includes the following operations. A UE receives an RAR from a network device. The RAR includes at least one first bit. The at least one first bit can be configured to indicate a number of repetitions of a PUSCH, and the PUSCH is configured to carry a third message during a random access procedure. The UE determines whether the at least one first bit is configured to indicate the number of the repetitions of the PUSCH according to first information. The first information is associated with the RAR.

In a second aspect, a method for radio communication is provided. The method includes the following operations. A network device indicates whether at least one first bit in an RAR indicates a number of repetitions of a PUSCH to a UE through first information. The first information is associated with the RAR. The at least one first bit can be configured to indicate the number of the repetitions of the PUSCH, and the PUSCH is configured to carry a third message during a random access procedure.

In a third aspect, a UE is provided to implement the method of the first aspect or the methods of various embodiments of the first aspect.

Specifically, the UE includes functional modules configured to implement the method of the first aspect or the methods of various embodiments of the first aspect.

In a fourth aspect, a network device is provided to implement the method of the second aspect or the methods of various embodiments of the second aspect.

Specifically, the network device includes functional modules configured to implement the method of the second aspect or the methods of various embodiments of the second aspect.

In a fifth aspect, a UE is provided. The UE includes a processor and a memory. The memory is configured to store thereon a computer program. The processor is configured to invoke and run the computer program stored in the memory to implement the method of the first aspect or the methods of various embodiments of the first aspect.

In a sixth aspect, a network device is provided. The network device includes a processor and a memory. The memory is configured to store thereon a computer program. The processor is configured to invoke and run the computer program stored in the memory to implement the method of the second aspect or the methods of various embodiments of the second aspect.

In a seventh aspect, a chip is provided to implement the method of any one of the first aspect and the second aspect, or the methods of various embodiments of any one of the first aspect and the second aspect.

Specifically, the chip includes a processor configured to invoke and run a computer program from a memory to enable a device installed with the chip to implement the method of any one of the first aspect and the second aspect, or the methods of various embodiments of any one of the first aspect and the second aspect.

In an eighth aspect, a computer-readable storage medium is provided. The computer-readable storage medium is configured to store a computer program that enables a computer to implement the method of any one of the first aspect and the second aspect, or the methods of various embodiments of any one of the first aspect and the second aspect.

In a ninth aspect, a computer program product is provided. The computer program product includes computer program instructions that enable a computer to implement the method of any one of the first aspect and the second aspect, or the methods of various embodiments of any one of the first aspect and the second aspect.

In a tenth aspect, a computer program is provided, which, when run in a computer, enables the computer to implement the method of any one of the first aspect and the second aspect, or the methods of various embodiments of any one of the first aspect and the second aspect.

According to the above technical solutions, a network device may send an RAR to a UE. At least one first bit in the RAR may be configured to indicate information on a number of repetitions of the Msg3 PUSCH. The network device may indicate whether the at least one first bit indicates information on the number of the repetitions of the Msg3 PUSCH by means of first information associated with the RAR. In other words, the network device may indicate whether the at least one first bit includes information on the number of the repetitions of the Msg3 PUSCH. Accordingly, the UE may receive the RAR from the network device, and determine whether the at least one first bit indicates the information on the number of the repetitions of the Msg3 PUSCH according to the first information associated with the RAR. In other words, the UE may determine whether the at least one first bit includes the information on the number of the repetitions of the Msg3 PUSCH. Further, the UE may perform the transmission of the Msg3 PUSCH according to a transmission mode of the Msg3 PUSCH as indicated by the network device.

DETAILED DESCRIPTION

Figure 1:
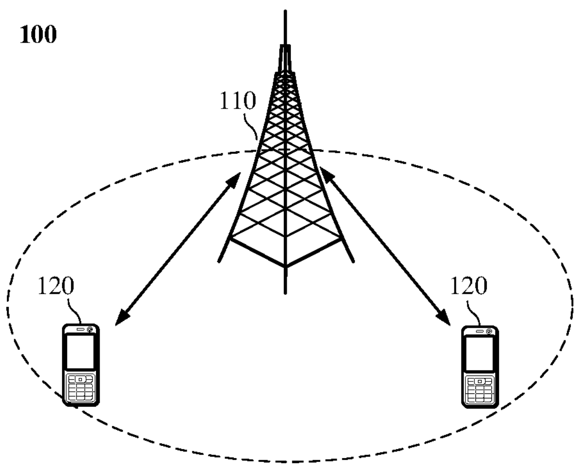
FIG. 1 is a diagram of architecture of a communication system according to an embodiment of the disclosure.

Technical solutions in the embodiments of the disclosure would be described below in combination with the drawings in the embodiments of the disclosure. Obviously, the described embodiments are a portion of the embodiments of the present disclosure, rather than all of them. Based on the embodiments of the disclosure, all other embodiments obtained by those skilled in the art without creative efforts fall within the scope of protection of the present disclosure.

The embodiments of the disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of NR system, a LTE-based access to unlicensed spectrum (LTE-U) system, a NR-based access to unlicensed spectrum (NR-U) system, a Non-Terrestrial Network (NTN) system, a Universal Mobile Telecommunication System (UMTS), a Wireless Local Area Network (WLAN), a Wireless Fidelity (WiFi), a 5th-Generation communication (5G) system, or another communication system, or the like.

Generally speaking, a limited number of connections are supported by a conventional communication system, and are also easy to be implemented. However, with the development of communication technologies, a mobile communication system may not only support conventional communication, but also support communication such as D2D communication, Machine to Machine (M2M) communication, Machine Type Communication (MTC), Vehicle to Vehicle (V2V) communication, or V2X communication, or the like, and the embodiments of the disclosure may also be applied to these communication systems.

Optionally, the communication system in the embodiments of the disclosure may be applied to a Carrier Aggregation (CA) scenario, or may be applied to a Dual Connectivity (DC) scenario, or may be applied to a standalone (SA) networking scenario.

Optionally, the communication system in the embodiments of the disclosure may be applied to an unlicensed spectrum. The unlicensed spectrum may also be considered to be a shared spectrum. Alternatively, the communication system in the embodiments of the disclosure may also be applied to a licensed spectrum. The licensed spectrum may also be considered to be a non-shared spectrum.

The embodiments of the disclosure describe various embodiments in combination with a network device and a terminal device. The terminal device may also be referred to as a User Equipment (UE), an access terminal, a user unit, a user station, a mobile station, a mobile platform, a remote station, a remote terminal, a mobile device, a user terminal, a terminal, a wireless communication device, a user agent, or a user device, or the like.

The UE may be a STAION (ST) in WLAN, or may be a cellular phone, a cordless phone, a Session Initiation Protocol (SIP) phone, a Wireless Local Loop (WLL) station, a Personal Digital Assistant (PDA) device, a handheld device with a wireless communication function, a computing device or other processing devices connected to a wireless modem, a vehicle-mounted device, a wearable device, a UE in a next-generation communication system such as an NR network, or a UE in a future-evolved Public Land Mobile Network (PLMN) network, or the like.

In the embodiments of the disclosure, the UE may be deployed on land, including indoor or outdoor, handheld, wearable, or vehicle-mounted; or may be deployed on a water surface (such as a ship); or may be deployed in the air (such as an aircraft, a balloon, a satellite, or the like).

In the embodiments of the disclosure, the UE may be a mobile phone, a tablet computer (Pad), a computer with a wireless transceiving function, a Virtual Reality (VR) UE, an Augmented Reality (AR) UE, a wireless UE in industrial control, a wireless UE in self driving, a wireless UE in remote medical, a wireless UE in smart grid, a wireless UE in transportation safety, a wireless UE in smart city, or a wireless UE in smart home, or the like.

As an example rather than limitation, in the embodiments of the disclosure, the UE may also be a wearable device. The wearable device may also be referred to as a wearable smart device, which is a general term of wearable devices developed by applying a wearable technology to intelligently design daily wearable objects, such as glasses, gloves, watches, clothing, shoes, or the like. The wearable device is directly worn on the body, or is a portable device integrated into a user's clothing or accessory. The wearable device is not only a hardware device, but also achieves powerful functions through software support, data interaction and cloud interaction. A generalized wearable smart device has full functions and a large size, and may not rely on a smart phone to implement full or part of the functions, such as a smart watch, or smart glasses, or the like; or only focus on a certain type of application function, and needs to be used in cooperation with other devices such as a smart phone, such as various kinds of smart bracelets, smart jewelry, or the like, for monitoring physical signs.

In the embodiments of the disclosure, the network device may be a device communicating with a mobile device. The network device may be an Access Point (AP) in WLAN, a Base Transceiver Station (BTS) in GSM or CDMA, or a NodeB (NB) in WCDMA, or an Evolutional Node B (eNB or eNodeB) in LTE, or a relay station or AP, or a network device (gNB) in a vehicle-mounted device, a wearable device and an NR network, or a network device in a future-evolved PLMN network, or a network device in an NTN network, or the like.

As an example rather than limitation, in the embodiments of the disclosure, the network device may have a mobility characteristic, for example, the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, or the like. Optionally, the network device may also be a base station arranged at a position such as land or water area, or other positions.

In the embodiments of the disclosure, the network device may provide services for a cell, and the UE may communicate with the network device through transmission resources (such as frequency domain resources or spectrum resources) used by the cell. The cell may be a cell corresponding to the network device (such as a base station), and the cell may belong to a macro base station, or may belong to a base station corresponding to a small cell. The small cell may include a metro cell, a micro cell, a pico cell, a femto cell, or the like. The small cells have characteristics of small coverage and low transmission power, and are suitable for providing high-rate data transmission services.

Exemplary, the communication system 100 applied in the embodiments of the disclosure is illustrated in FIG. 1. The communication system 100 may include a network device 110. The network device 110 may communicate with a UE 120 (also referred to as a communication terminal or a terminal). The network device 110 may provide a specific geographic region with communication coverage, and may communicate with a UE located within the coverage region.

FIG. 1 illustratively shows one network device and two UEs. Optionally, the communication system 100 may include multiple network devices, and other numbers of terminal devices may be included within a respective coverage of each of the network devices, which are not limited in the embodiments of the disclosure.

Optionally, the communication system 100 may further include other network entities, such as a network controller, a Mobile Management Entity (MME), or the like, which are not limited in the embodiments of the disclosure.

It should be understood that in the embodiments of the disclosure, a device with a communication function in a network/system may be referred to as a communication device. Taking the communication system 100 illustrated in FIG. 1 as an example, the communication device may include a network device 110 and a UE 120 of which each has a communication function. The network device 110 and the UE 120 may be the specific devices mentioned above, which would not be elaborated here. The communication device may further include other devices in the communication system 100, such as a network controller, a MME or other network entities, which are not limited in the embodiments of the disclosure.

It should be understood that terms "system" and "network" in the disclosure may usually be used interchangeably. In the disclosure, term "and/or" refers to only an association relationship for describing associated objects and represents that three relationships may exist. For example, A and/or B may represent three cases: i.e., only A exists, both A and B exist, and only B exists. Furthermore, character "/" in the disclosure usually represents that previous and next associated objects form an "or" relationship.

It should be understood that "indication" mentioned in the embodiments of the disclosure may be a direct indication, or may be an indirect indication, or may be represented as having an association relationship. For example, A indicates B, which may indicate that A directly indicates B, for example, B may be obtained by A; or may indicate that A indirectly indicates B, for example, A indicates C, and B may be obtained by C; or may indicate that A and B have an association relationship there-between.

In descriptions of the embodiments of the disclosure, term "corresponding" may indicate that there are direct or indirect correspondences between two objects, or may indicate that the two objects have an association relationship there-between, or may have an indicating and indicated relationship, a configuring and configured relationship, or the like.

In the embodiments of the disclosure, "predefined" may be achieved by pre storing corresponding codes, tables, or other modes that can be used to indicate related information in a device (e.g., a UE or a network device), specific implementations of which is not limited in the embodiments of the disclosure. For example, "predefined" may be as defined in a protocol.

In the embodiments of the disclosure, a "protocol" may refer to a standard protocol in the field of communications, and may include, for example, an LTE protocol, an NR protocol, and a related protocol applying to a future communication system, which would not be limited in the embodiments of the disclosure.

In the NR system, a network device may schedule PUSCH transmission by sending an UL grant. The uplink grant may be carried by Downlink Control Information (DCI) in a DCI format 0_0 or in a DCI format 0_1.

In some cases, when a network device schedules uplink data transmission through a DCI carrying the UL grant, a Time Domain Resource Assignment (TDRA) field may be carried in the DCI. For example, the TDRA field may be of 4 bits, and may be configured to indicate 16 rows in a TDRA table, with each row containing a distinct combination of resource assignment (e.g., a start point S, a length and k2 and different types of the PUSCH). K2 denotes a slot offset between a slot where the DCI is located and a slot where the PUSCH is located. PUSCH TDRA may be of a Type A or a Type B. The Type A and the Type B differ in that the ranges of candidate value of S and L for Type A and Type B are different. The Type A is mainly for a slot-based service, with S being forward and L being long. The Type B is mainly for an Ultra-reliable and Low Latency Communication (URLLC) service, which has a high latency requirement. Therefore, S is flexible, which can facilitate the transmission of the URRLLC service that may arrive at any time, and L is short, which can reduce the transmission latency. For example, ranges for the candidate value of S and L are as shown below in Table 1.

TABLE 1

| PUSCH | Normal Cyclic Prefix (CP) | | | Extended CP | | |
|---|---|---|---|---|---|---|
| mapping type | S | L | S + L | S | L | S + L |
| type A | 0 | {4, . . . , 14} | {4, . . . , 14} (repetition type A only) | 0 | {4, . . . , 12} | {4, . . . , 12} |
| type B | {0, . . . , 13} | {1, . . . , 14} | {1, . . . ,14} for repetition type A, {1, . . . ,27} for repetition type B | {0, . . . , 11} | {1, . . . , 12} | {1, . . . , 12} |

In addition to the information on TDRA, the DCI carrying the UL grant may further include frequency domain resource information, a Modulation and Coding Scheme (MCS), a Transmission Power Control (TPC) command, frequency hopping information, a redundancy version, a Hybrid Automatic Repeat Qequest (HARQ) process number, etc., which would not be elaborated here.

In a NR system, to support the URLLC service, transmission reliability may be improved by repetitive transmission of the uplink data. The repetition of the PUSCH may include two types, which are PUSCH repetition Type A and PUSCH repetition Type B. The PUSCH repetition type may be indicated and determined through a higher-layer signaling. The mode of PUSCH TDRA may differ for the PUSCH repetition Type A and the PUSCH repetition Type B.

For example, for the PUSCH repetition Type A, a start symbol S of the PUSCH and a number L of successive symbols starting from the symbol S may be determined through a Start and Length Indicator Value (SLIV) indicated in the Physical Downlink Control Channel (PDCCH) scheduling the PUSCH.

For the PUSCH repetition Type B, the start symbol S of the PUSCH and the number L of successive symbols starting from the symbol S may be determined respectively through the startSymbol information and the length information corresponding to the row in the TDRA table.

PUSCH-TimeDomainResourceAllocationList-r16 is introduced in the Release 16 (R16) to support the TDRA information for the repetition of the PUSCH, such as a symbol where the PUSCH is located (e.g., the start symbol and the length), a number K of repetitions of the PUSCH (numberOfRepetitions), etc. The UE may determine a time domain resource used for the repetition of the PUSCH according to the above information and a PUSCH repetition type determined through the higher-layer signaling.

In a NR system, four-step random access procedure may be supported, which includes transmission of an Msg1, an Msg2, an Msg3, and an Msg4. The Msg3 is carried by the PUSCH. The UL grant of the PUSCH used for initial transmission of the Msg3 is carried by an RAR in the Msg2. As shown in Table 2, UL grant information in the RAR may include time domain resource and frequency domain resource assignment information of the PUSCH, a TPC command, frequency hopping, a MCS, etc.

TABLE 2

| RAR grant field | Number of bits |
|---|---|
| Frequency hopping flag | 1 |
| PUSCH frequency resource assignment | 14, for operation without shared spectrum channel access |
| PUSCH time resource assignment | 4 |
| MCS | 4 |
| TPC command for PUSCH | 3 |

TABLE 2-continued

| RAR grant field | Number of bits |
|---|---|
| CSI request | 1 |
| ChannelAccess-CPext | 0, for operation without shared spectrum channel access<br>2, for operation with shared spectrum channel access |

If the network does not receive the Msg3 from the UE correctly, scheduling information used for the repetitions of the Msg3 would be indicated by means of the DCI. For example, the scheduling information may be carried in a DCI format 0_0 scrambled by using a Temporary Cell Radio Network Temporary Identity (TC-RNTI). In addition to the contents contained in the UL grant information in the RAR, the DCI format 0_0 may further include information such as a New Data Indicator (NDI), a redundancy version, a HARQ process number, and the like.

In some embodiments, the network device may indicate the number of repetitions of the Msg3 by multiplexing the information filed of the UL grant information in the RAR, such as by means of a TDRA field or a PUSCH frequency domain resource assignment field, etc.

In some cases, the UE may request the repetitions of the Msg3 from the network device, and the network device may decide whether to schedule the repetitions of the Msg3. That is, in some cases, the network device may schedule the repetitions of the Msg3, and in these cases, the number of repetitions of the Msg3 needs to be indicated. In some cases, the network device may not schedule the repetitions of the Msg3, and in these cases, the number of repetitions of the Msg3 does not need be indicated. The UE is not aware of whether the network device approves the request from the UE. Therefore, an urgent problem to be solved is how the UE can interpret the information field in the RAR that is multiplexed to indicate the number of repetitions of the PUSCH so as to ensure that the network device and the UE have the same understanding of the transmission mode of the Msg3.

In order to facilitate understanding of the technical solution of the embodiments of the disclosure, the technical solution of the disclosure would be elaborated below with specific embodiments. The above related technologies may be combined, as optional schemes, with the technical solution of the embodiments of the disclosure arbitrarily, which fall within the scope of protection of the embodiments of the disclosure. Embodiments of the disclosure include at least part of the content as follows.

Figure 2:
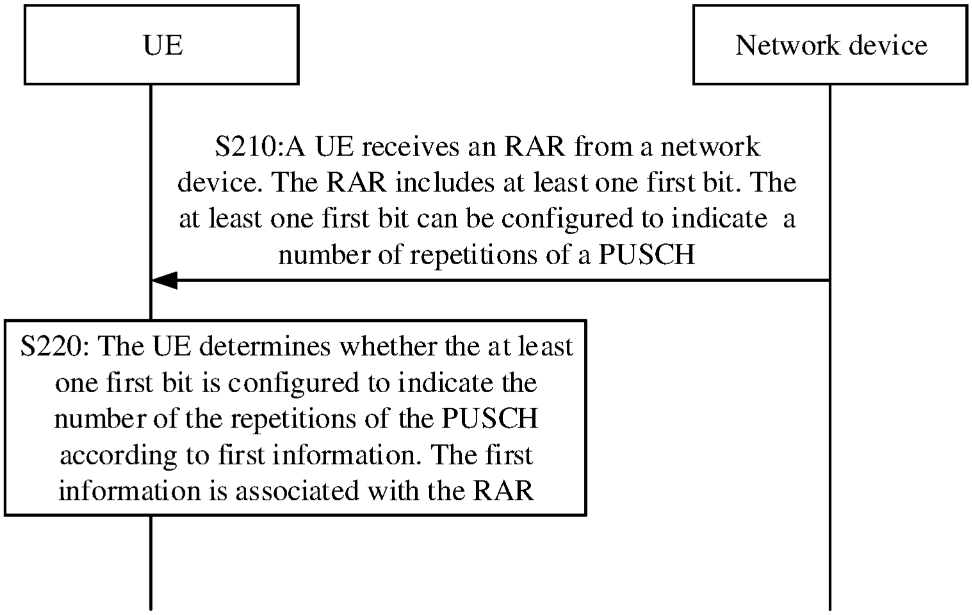
FIG. 2 is a diagram of interaction of a method for radio communication according to an embodiment of the disclosure.

FIG. 2 is a diagram of interaction of a method 200 for radio communication according to an embodiment of the disclosure. As shown in FIG. 2, the method 200 includes at least part of the following content.

At S210, a UE receives an RAR from a network device. The RAR includes at least one first bit. The at least one first bit can be configured to indicate a number of repetitions of a PUSCH. The PUSCH is configured to carry a third message (i.e., Msg3) during a random access procedure.

At S220, the UE determines whether the at least one first bit is configured to indicate the number of the repetitions of the PUSCH according to first information. The first information is associated with the RAR.

In the embodiments of the disclosure, the RAR is configured for scheduling transmission of the Msg3, such as initial transmission of the Msg3. The RAR may include UL grant information configured for the initial transmission of the Msg3.

In the embodiments of the disclosure, the RAR is configured for scheduling the transmission of the Msg3, which may refer to that the RAR is configured for scheduling transmission of the PUSCH carrying the Msg3.

In the embodiments of the disclosure, the PUSCH carrying the Msg3 may also be referred to as an Msg3 PUSCH.

In some embodiments, the UE may request the repetitions (i.e., repetitive transmission) of the Msg3 from the network device, or request the repetitions (i.e., repetitive transmission) of the PUSCH carrying the Msg3.

In some embodiments, the UE may indicate whether the UE requests the repetitions of the Msg3 PUSCH to the network device through a first message. The first message may be a first message during the random access procedure (i.e., Msg1). Alternatively, the first message may be a random access preamble.

For example, the UE may indicate, through at least one of a random access preamble, an initial uplink Band Width Part (BWP) on which the first message is transmitted, or a Physical Random Access Channel (PRACH) resource on which the first message is transmitted, whether the UE requests the repetitions of the Msg3 PUSCH to the network device.

In some embodiments, the PRACH resource may include a PRACH occasion (RO) resource.

As an example, the network device may configure, for the UE, a preamble or a preamble set used when the repetitions of the Msg3 PUSCH are requested, and a preamble or a preamble set used when the repetitions of the Msg3 PUSCH are not requested. To request the repetitions of the Msg3 PUSCH, the UE may send the preamble or a preamble in the preamble set that are corresponding to the case where the repetitions of the Msg3 PUSCH are requested.

As another example, the network device may configure, for the UE, an initial uplink BWP used when the repetitions of the Msg3 PUSCH are requested and an initial uplink BWP used when the repetitions of the Msg3 PUSCH are not requested. To request the repetitions of the Msg3 PUSCH, the UE may send a preamble on the initial uplink BWP corresponding to the case where the repetitions of the Msg3 PUSCH are requested.

As yet another example, the network device may configure, for the UE, a RO resource used when the repetitions of the Msg3 PUSCH are requested and a RO resource used when the repetitions of the Msg3 PUSCH are not requested. To request the repetitions of the Msg3 PUSCH, the UE may send a preamble on the RO resource corresponding to the case where the repetitions of the Msg3 PUSCH are requested.

In some embodiments, the network device may decide whether to approve a request of the UE, or whether to schedule the repetitions carrying the Msg3, or whether to schedule the repetitions of the Msg3 PUSCH.

For example, the network device may not schedule the repetitions of the Msg3 in the case where the UE is in a good channel condition, and schedule the repetitions of the Msg3 in the case where the UE is in a poor channel condition.

In the embodiments of the disclosure, the RAR includes at least one first bit. The at least one first bit can be configured to indicate the information on the number of the repetitions of the PUSCH carrying the Msg3.

It should be understood that the at least one first bit can be configured to indicate the information on the number of the repetitions of the PUSCH carrying the Msg3, which means that the at least one first bit can be configured to indicate the information on the number of the repetitions of the Msg3 PUSCH, but not always indicates information on the number of the repetitions of the Msg3 PUSCH. That is, the at least one first bit may indicate the information on the number of the repetitions of the Msg3 PUSCH in some cases, and may not indicate the information on the number of the repetitions of the Msg3 PUSCH in some other cases.

In some embodiments, the at least one first bit includes at least one bit in a first information field in the RAR. Optionally, the first information field may include one or more information fields in the RAR.

In some embodiments, the first information field includes at least one information field in the uplink grant in the RAR. That is, the at least one first bit may include at least one bit in the uplink grant information of the RAR.

For example, the first information field may include at least one information field as shown in the Table 2. That is, the at least one first bit may include at least one bit in at least one information field as shown in the Table 2.

As an example, the first information field includes one or more of the following information fields in the UL grant information in the RAR: the PUSCH frequency domain resource assignment information, the MSC, the TPC configured for the PUSCH, the ChannelAccess-CPext, and the Channel State Information (CSI) request. That is, the at least one first bit may include one or more bits in one or more of the following information fields in the UL grant information in the RAR: the PUSCH frequency domain resource assignment information, the MSC, the TPC configured for the PUSCH, the ChannelAccess-CPext, and the CSI request.

In other words, the network device may indicate the information on the number of the repetitions of the Msg3 PUSCH by multiplexing at least one bit in one or more of the following information fields in the RAR: the PUSCH frequency domain resource assignment information, the MSC, the TPC filed configured for the PUSCH, the ChannelAccess-CPext, and the CSI request.

As another example, the first information field includes the information field of the PUSCH TDRA (i.e., the TDRA information field) in the uplink grant information in the RAR. For example, the at least one first bit includes at least one bit in the TDRA information field in the uplink grant in the RAR.

In other words, the network device may indicate the information on the number of the repetitions of the Msg3 PUSCH by multiplexing at least one bit in the TDRA information field in the uplink grant in the RAR.

In some other embodiments, the network device may indicate the information on the number of the repetitions of the Msg3 PUSCH by multiplexing one or more bits in the information fields other than the UL grant information in the RAR.

In the embodiments of the disclosure, the RAR is included in a Media Access Control Protocol Data Unit (MAC PDU). A MAC PDU includes a MAC PDU header, at least one MAC subPDU, and a possible pad bit.

A MAC subPDU may include a subheader of the MAC subPDU. The subheader of the MAC subPDU may correspond to a MAC Service Data Unit (SDU) or a MAC Control Element (MAC CE) or a pad bit.

In some other embodiments, the network device may indicate the information on the number of the repetitions of the Msg3 PUSCH by multiplexing information in a MAC PDU carrying the RAR. For example, the network device may indicate the information on the number of the repetitions of the Msg3 PUSCH by multiplexing the header of the MAC PDU or the subheader of the MAC subPDU in the MAC PDU. That is, the at least one first bit may include one or more bits in the MAC PDU carrying the RAR.

Hereinafter, the at least one first bit including at least one bit in the RAR is taken as an example for description, but the present disclosure is not limited thereto.

To sum up, in the embodiments of the disclosure, the at least one first bit may have a first meaning in some cases. The first meaning may refer to that the Msg3 is not transmitted repeatedly, or the first meaning may refer to the original meaning of the at least one first bit before multiplexing the at least one first bit to indicate the information on the number of the repetitions of the Msg3 PUSCH. The at least one first bit may have a second meaning in some other cases, and the at least one first bit is at least configured to indicate the information on the number of the repetitions of the Msg3 PUSCH. For example, in addition to indicating the information on the number of the repetitions of the Msg3 PUSCH, the at least one first bit is further configured to indicate information content that needs to be indicated in the original meaning.

In some embodiments of the disclosure, the UE may determine, according to the first information associated with the RAR, the meaning or the interpretation mode of the at least one first bit, such as whether the meaning of the at least one first bit is the first meaning or the second meaning, or whether the at least one first bit is interpreted according to the first meaning or according to the second meaning. Alternatively, the first information may be configured for determining whether the at least one first bit indicates the number of the repetitions of the Msg3 PUSCH, or the first information may be configured for determining whether the at least one first bit includes the information on the number of the repetitions of the Msg3 PUSCH, or the first information may be configured for determining the transmission mode of the Msg3 PUSCH, such as the Msg3 PUSCH transmission with repetition and the Msg3 PUSCH transmission without repetition.

It should be noted that in the embodiments of the disclosure, the first information associated with the RAR may include, but is not limited to, information included in the RAR, information related to the PDCCH scheduling the RAR, other downlink information received before the RAR during the random access procedure, and the like.

Therefore, in the embodiments of the disclosure, the network device may indicate whether the at least one first bit in the RAR indicates the number of the repetitions of the Msg3 PUSCH or the transmission mode of the Msg3 PUSCH to the UE through the first information associated with the RAR.

Accordingly, after receiving the RAR, the UE may determine, according to the first information associated with the RAR, whether the at least one first bit in the RAR indicates the number of the repetitions of the Msg3 PUSCH or indicates the transmission mode of the Msg3 PUSCH, and further performs the transmission of the Msg3 PUSCH according to the transmission mode of the Msg3 PUSCH as indicated by the network device, thereby ensuring that both the network device and the UE have the same understanding of the transmission mode of the Msg3 PUSCH.

Specific implementation of the first information is described below with reference to specific embodiments.

Embodiment 1: the first information includes at least one second bit in the RAR. The at least one second bit differs from the at least one first bit.

The at least one second bit differs from the at least one first bit, which may refer to that positions of the at least one first bit and the at least one second bit are different in the RAR. For example, the at least one first bit and the at least one second bit are located in different information fields in the RAR. Alternatively, the at least one first bit and the at least one second bit are different bits in a same information field.

That is, the network device may indicate whether the at least one first bit indicates the number of the repetitions of the Msg3 PUSCH by using information of the bits other than the at least one first bit in the RAR.

Accordingly, the UE may determine, according to the information of the bits other than the at least one first bit in the RAR, whether the at least one first bit indicates the number of the repetitions of the Msg3 PUSCH, and further perform the transmission of the Msg3 PUSCH according to the transmission mode of the Msg3 PUSCH as indicated by the network device.

It should be noted that the at least one second bit may be any one or more bits other than the at least one first bit in the RAR, which would not be limited in the disclosure.

In some embodiments, the at least one second bit includes at least one bit in a second information field in the RAR. Optionally, the second information field may include one or more information fields in the RAR.

In some embodiments, the second information field includes at least one information field in the uplink grant information in the RAR. That is, the at least one second bit may include at least one bit in the uplink grant information in the RAR.

For example, the second information field may include at least one information field shown in the Table 2. That is, the at least one second bit may include at least one bit in at least one information field as shown in the Table 2.

As an example, the second information field includes one or more of the following information fields in the UL grant information in the RAR: the PUSCH frequency domain resource assignment information, the MSC, the TPC configured for the PUSCH, the ChannelAccess-CPext, and the Channel State Information (CSI) request. That is, the at least one second bit may include one or more bits in one or more of the following information fields in the UL grant information in the RAR: the PUSCH frequency domain resource assignment information, the MSC, the TPC configured for the PUSCH, the ChannelAccess-CPext, and the CSI request.

As another example, the second information field includes the information field of the PUSCH TDRA (i.e., the TDRA information field) in the uplink grant information in the RAR. For example, the at least one second bit includes at least one bit in the TDRA information field in the uplink grant in the RAR.

In some other embodiment, the network device may indicate whether the at least one first bit indicates the number of the repetitions of the Msg3 PUSCH by using one or more bits in the information field other than the UL grant information in the RAR.

In some embodiments of the disclosure, the at least one second bit and the at least one first bit are carried in a same information field in the RAR.

In some embodiments, both the at least one second bit and the at least one first bit are carried in a same information field in the UL grant in the RAR.

As an example, both the at least one first bit and the at least one second bit are carried in the TDRA information field in the UL grant in the RAR.

For example, the at least one second bit is of a first value, which may deIt should be noted that the at least one first bit indicates the number of the repetitions of the Msg3 PUSCH, and the at least one second bit is of a second value, which may deIt should be noted that the at least one first bit does not indicate the number of the repetitions of the Msg3 PUSCH.

It should be noted that in the case where the at least one first bit indicates the number of the repetitions of the Msg3 PUSCH, the at least one first bit includes information on the number of the repetitions of the Msg3 PUSCH. In this case, the UE may determine the number of the repetitions of the Msg3 PUSCH according to the at least one first bit. In the case where the at least one first bit does not indicate the number of the repetitions of the Msg3 PUSCH, the at least one first bit does not include information on the number of the repetitions of the Msg3 PUSCH. In this case, the UE does not determine the number of the repetitions of the Msg3 PUSCH according to the at least one first bit.

In some other embodiments of the disclosure, the at least one second bit and the at least one first bit are carried in different information fields in the RAR.

In some embodiments, the at least one second bit and the at least one first bit are carried in different information fields in the UL grant information in the RAR.

In some embodiments, the at least one first bit is carried in at least one information filed of the following information fields in the UL grant information: the PUSCH time domain resource assignment, the PUSCH frequency domain resource assignment, the MCS, the TPC command for the PUSCH, the ChannelAccess-CPext, and the CSI request. The at least one second bit is carried in the information field in the UL grant information other than the at least one information field.

As an example, the at least one first bit includes at least one bit in the TDRA information field in the UL grant information in the RAR, and the at least one second bit includes at least one bit in the information field other than the TDRA information field in the UL grant in the RAR. For example, the at least one second bit may include at least one bit in at least one of the following information fields in the UL grant: the PUSCH frequency domain resource assignment, the MSC, the TPC configured for the PUSCH, the ChannelAccess-CPext, and the CSI request.

For example, the at least one first bit is implemented by using the TDRA information field. The at least one second bit is configured to indicate whether the at least one first bit indicates the information on the number of the repetitions of the PUSCH, which includes the followings.

The at least one second bit is configured to indicate the meaning of the TDRA information field, e.g., whether the TDRA information field is interpreted according to the TDRA information or according to the TDRA information and the information on the number of the repetitions, or whether the value of the TDRA information field is interpreted according to first TDRA list information or according to second TDRA list information.

The first TDRA list information includes the TDRA information, but does not include the information on the number of the repetitions. The second TDRA list information includes both the TDRA information and the information on the number of the repetitions.

Optionally, the first TDRA list information may include multiple rows, and each row includes a respective set of resource assignment information.

Optionally, the second TDRA list information may include multiple rows, and each row includes a respective set of resource assignment information and information on the repetitions.

Optionally, the first TDRA list information may be pre-configured, or configured by the network device. For example, the first TDRA list information may configured by the network device through a common PUSCH configuration (pusch-ConfigCommon).

Optionally, the second TDRA list information may be pre-configured, or configured by the network device. For example, the second TDRA list information may configured by the network device through the common PUSCH configuration (pusch-ConfigCommon).

Description is made below by taking the TDRA information field including 4 bits, the at least one first bit including the 4 bits in the TDRA information field, and the at least one second bit including 1 bit in the CSI request information field as an example. When the 1 bit in the CSI request information field is of a first value (e.g., 0), it is indicated that the TDRA information field indicates the number of the repetitions of the Msg3 PUSCH. In this case, the TDRA information field is configured for determining both the number of the repetitions of the Msg3 PUSCH and the TDRA information of the Msg3 PUSCH. The UE may determine the number of the repetitions and the TDRA information of the Msg3 PUSCH according to the second TDRA list information. When the 1 bit in the CSI request information field is of a second value (e.g., 1), it is indicated that the TDRA information field does not indicate the number of the repetitions of the Msg3 PUSCH. In this case, the TDRA information field is configured for determining the TDRA information of the Msg3 PUSCH, and is not configured for determining the number of the repetitions of the Msg3 PUSCH. The UE may determine the TDRA information of the Msg3 PUSCH according to the first TDRA list information.

Therefore, in the Embodiment 1, for the UE that requests the repetitions of the Msg3 PUSCH, it can be determined whether the network device has scheduled the repetitions of the Msg3 PUSCH (i.e., the transmission mode of the Msg3 PUSCH configured by the network device) according to the value of the at least one second bit, so that the meaning or the interpretation mode of the at least one first bit can be determined. The transmission of the Msg3 PUSCH can be performed according to the transmission mode of the Msg3 PUSCH indicated by the network device, thereby ensuring that the UE and the network device have the same understanding of the transmission mode of the Msg3 PUSCH.

Embodiment 2: the first information includes a Random Access Radio Network Temporary Identity (RA-RNTI) corresponding to a PDCCH scheduling the RAR.

In the Embodiment 2, the RA-RNTI corresponding to the PDCCH scheduling the RAR is determined according to first identification information. The first identification information is related to the transmission mode of the Msg3 PUSCH determined by the network device.

Optionally, the transmission mode of the PUSCH includes the PUSCH transmission with repetition and the PUSCH transmission without repetition.

Optionally, the first identification information corresponds to different values for different transmission modes of the Msg3 PUSCH. Thus, when the network device schedules different transmission modes of the Msg3 PUSCH, the RA-RNTIs determined according to the first identification information are also different. That is, the network device may indicate whether the repetitions of the Msg3 PUSCH are scheduled through different RA-RNTIs. Accordingly, the UE may determine, according to a received RA-RNTI corresponding to the PDCCH, whether the network device schedules the repetitions of the Msg3 PUSCH.

In some embodiments of the disclosure, the RA-RNTI may be configured for scrambling a Cyclical Redundancy Check (CRC) of the PDCCH.

In some embodiments, the UE may determine the RA-RNTI corresponding to the PDCCH scheduling the RAR according to following formula (1):

$$\text{RA-RNTI}=1+s\_id+14\times t\_id+14\times 80\times f\_id+14\times 80\times 8\times ul\_carrier\_id+14\times 80\times 8\times 2\times Q \quad \text{Formula (1).}$$

Q is the first identification information.

s_id is an index of a first Orthogonal Frequency Division Multiplexing (OFDM) symbol in a PRACH resource.

t_id is an index of a first slot in the PRACH resource.

f_id is an index of the PRACH resource in frequency domain.

ul_carrier_id is an uplink carrier where the PRACH resource is located.

Optionally, if the network device determines to schedule the repetitions of the Msg3 PUSCH, Q is of a third value and a first RA-RNTI is generated. Alternatively, if the network device determines not to schedule the repetitions of the Msg3 PUSCH, Q is of a fourth value and a second RA-RNTI is generated. The third value is not equal to the fourth value. As an example, the third value is not 0, and the fourth value is 0.

Accordingly, the UE may also generate the first RA-RNTI and the second RNTI respectively according to the third value and the fourth value of Q, receive the PDCCH according to the first RA-RNTI and the second RA-RNTI, and determine whether the network device schedules the repetitions of the Msg3 PUSCH according to a RA-RNTI with which the PDCCH is successfully received. For example, if the PDCCH is successfully received according to the first RA-RNTI, it is indicated that the network device schedules the repetitions of the Msg3 PUSCH. Alternatively, if the PDCCH is successfully received according to the second RA-RNTI, it is indicated that the network device does not schedule the repetitions of the Msg3 PUSCH.

It should be noted that in the embodiments of the disclosure, the network device does not schedule the repetitions of the Msg3 PUSCH, which may mean that the network device schedules the Msg3 PUSCH transmission without repetition.

In some embodiments, the RA-RNTI is determined according to formula (1) regardless of whether the UE requests the repetitions of the Msg3 PUSCH.

In some embodiments, for a UE having requested the repetitions of the Msg3 PUSCH, the RA-RNTI corresponding to the PDCCH scheduling the RAR may be determined according to the following formula:

$$\text{RA-RNTI}=1+s\_id+14\times t\_id+14\times 80\times f\_id+14\times 80\times 8\times ul\_carrier\_id+14\times 80\times 8\times 2\times Q \quad \text{Formula (2).}$$

Q is the first identification information.

s_id is an index of a first Orthogonal Frequency Division Multiplexing (OFDM) symbol in a PRACH resource.

t_id is an index of a first slot in the PRACH resource.

f_id is an index of the PRACH resource in frequency domain.

ul_carrier_id is an uplink carrier where the PRACH resource is located.

In some embodiments, for a UE not requesting the repetitions of the Msg3 PUSCH, the RA-RNTI corresponding to the PDCCH scheduling the RAR may be determined according to the following formula:

$$\text{RA-RNTI}=1+s\_id+14\times t\_id+14\times 80\times f\_id+14\times 80\times 8\times ul\_carrier\_i \quad \text{Formula (3).}$$

s_id is an index of a first Orthogonal Frequency Division Multiplexing (OFDM) symbol in a PRACH resource.

t_id is an index of a first slot in the PRACH resource.

f_id is an index of the PRACH resource in frequency domain.

ul_carrier_id is an uplink carrier where the PRACH resource is located.

In some embodiments, in the case where the UE requesting the repetitions of the Msg3 PUSCH determines the RA-RNTI according to formula (2) and the UE not requesting the repetitions of the Msg3 PUSCH determines the RA-RNTI according to formula (3), Q is not equal to 0. Alternatively, Q is not equal to 0 or 1. Therefore, the RA-RNTI of UE requesting the repetitions of the Msg3 PUSCH and the RA-RNTI of UE not requesting the repetitions of the Msg3 PUSCH can be distinguished, or the RA-RNTI of UE requesting the repetitions of the Msg3 PUSCH, the RA-RNTI of UE not requesting the repetitions of the Msg3 PUSCH and the MS GB-RNTI of UE not requesting the repetitions of the Msg3 PUSCH can be distinguished.

Based on implementation in Embodiment 2, the PDCCH scheduling the RAR for the repetitions of the Msg3 PUSCH and the PDCCH not scheduling the RAR for the repetitions of the Msg3 PUSCH correspond to different RA-RNTIs. Accordingly, the UE requesting the repetitions of the Msg3 PUSCH may determine whether the at least one first bit in the RAR indicates the information on the number of the repetitions of the Msg3 PUSCH, or whether the network device schedules the repetitions of the Msg3 PUSCH, or whether the network device configures the information on the number of the repetitions of the Msg3 PUSCH.

Figure 3:
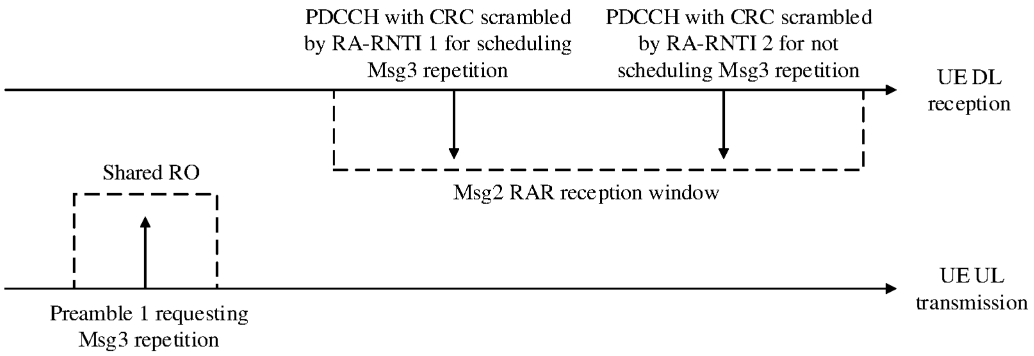
FIG. 3 is a diagram of indicating different transmission modes of an Msg3 through different RA-RNTIs.

Examples are made with reference to FIG. 3. It can be determined through different preambles whether a UE sharing the RO resource has requested the repetitions of the Msg3 PUSCH. For example, Preamble 1 is configured by the network device for requesting the repetitions of the Msg3 PUSCH. A UE may send the Preamble 1 on a shared RO. After receiving the Preamble 1, the network device may determine that the UE has requested the repetitions of the Msg3 PUSCH.

Further, when deciding to schedule the repetitions of the Msg3 PUSCH, the network device may scramble the CRC of the PDCCH with a RA-RNTI 1, so as to indicate to the UE that the network device schedules the repetitions of the Msg3 PUSCH, or that the at least one first bit indicates the information on the number of the repetitions of the Msg3 PUSCH.

Alternatively, when deciding not to schedule the repetitions of the Msg3 PUSCH, the network device may scramble the CRC of the PDCCH with a RA-RNTI 2, so as to indicate to the UE that the network device does not schedule the repetitions of the Msg3 PUSCH, or that the at least one first bit does not indicate the information on the number of the repetitions of the Msg3 PUSCH.

Further, the UE may receive the RAR from the network device in an RAR reception window. In case of successfully receiving the RAR according to the RA-RNTI 1, it may be determined that the network device schedules the repetitions of the Msg3 PUSCH. Alternatively, in case of successfully receiving the RAR according to the RA-RNTI 2, it may be determined that the network device does not schedule the repetitions of the Msg3 PUSCH, or schedules the Msg3 PUSCH transmission without repetition.

Embodiment 3: the first information includes information in the PDCCH scheduling the RAR.

It should be noted that in the Embodiment 3, the first information may be any information in the PDCCH scheduling the RAR. The position and the number of bits of the first information are not limited in the disclosure.

As an example, the network device may multiplex at least one bit in an information field with an existing meaning in the PDCCH to indicate whether the at least one first bit indicates the number of the repetitions of the Msg3 PUSCH. Alternatively, the network device may also indicate, through at least one reserved bit in the PDCCH, whether the at least one first bit indicates the number of the repetitions of the Msg3 PUSCH.

In some embodiments, the first information includes at least one reserved bit in the PDCCH scheduling the RAR. The at least one reserved bit may be configured to indicate an interpretation mode of the at least one first bit in the RAR to the UE requesting the repetitions of the Msg3 PUSCH.

In some embodiments, whether the UE has requested the repetitions of the Msg3 PUSCH may be determined through a preamble sent by the UE or a preamble set corresponding to the preamble sent by the UE. For the UE requesting the repetitions of the Msg3 PUSCH through different preambles or different preamble sets, the network device may indicate whether the at least one first bit in the RAR corresponding to the different preambles or the different preamble sets indicates the information on the number of the repetitions of the Msg3 PUSCH, or whether the network device schedules the repetitions of the Msg3 PUSCH, or whether the network device configures the information on the number of the repetitions of the Msg3 PUSCH.

As an example, the first information includes multiple reserved bit sets. Each reserved bit set of the multiple reserved bit sets may include at least one reserved bit. Each reserved bit set of the multiple reserved bit sets corresponds to a respective preamble or a respective preamble set, and a value of each reserved bit set of the multiple reserved bit sets is configured to indicate whether at least one first bit in an RAR corresponding to the random access preamble or the random access preamble set that corresponds to the reserved bit set is configured to indicate the number of the repetitions of the PUSCH, or whether the network device schedules the repetitions of the Msg3 PUSCH, or whether the network device configures the information on the number of the repetitions of the Msg3 PUSCH.

Optionally, the RAR corresponding to the preamble or the preamble set may refer to an RAR carrying response information of the UE sending the preamble or a preamble in the preamble set.

Optionally, the random access preamble or the random access preamble set corresponding to the reserved bit set is configured to be used by the UE to request the repetitions of the PUSCH.

Figure 4:
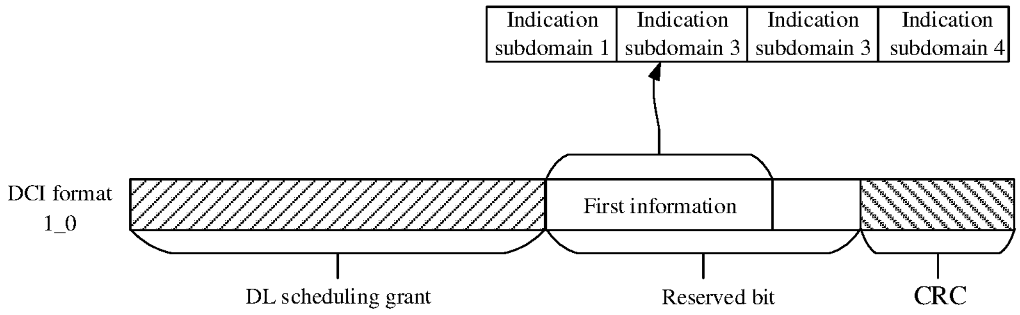
FIG. 4 is a diagram of indicating requesting different transmission modes of the Msg3 by means of reserved bits in a PDCCH scheduling an RAR.

Examples are made with reference to FIG. 4. The first information includes four reserved bit sets, which are corresponding to four indication subdomains in the DCI, (i.e., indication subdomain 1 to indication subdomain 4). Each one of the four indication subdomains may correspond to a respective preamble or a respective preamble set. For each one of the four indication subdomains, a value of the indication subdomain may be configured to indicate whether at least one first bit in an RAR corresponding to the preamble or the preamble set indicates the number of the repetitions of the Msg3 PUSCH.

For example, an indication subdomain includes 1 bit. The value of the 1 bit is configured to indicate whether at least one first bit in the RAR corresponding to the preamble or the preamble set that are corresponding to the indication subdomain indicates the number of the repetitions of the Msg3 PUSCH.

As an example, the value of the indication subdomain is 0, which means that the at least one first bit in the RAR does not indicate the information on the number of the repetitions of the Msg3 PUSCH. The UE using the preamble or the preamble set corresponding to requesting the repetitions of the Msg3 PUSCH does not perform the repetitions of the Msg3 PUSCH.

As an example, the value of the indication subdomain is 1, which means that the at least one first bit in the RAR carries the information on the number of the repetitions of the Msg3 PUSCH. The UE using the preamble or the preamble set corresponding to requesting the repetitions of the Msg3 PUSCH performs the repetitions of the Msg3 PUSCH.

Embodiment 4: the first information includes information in a MAC PDU carrying the RAR.

In some embodiments, the RAR is included in a MAC PDU. A MAC PDU includes a MAC PDU header, 0 or at least one MAC subPDU, and a possible pad bit.

A MAC subPDU may include a subheader of the MAC subPDU. The subheader of the MAC subPDU may correspond to a MAC SDU or a MAC CE or a pad bit.

In some embodiments, the at least one second bit may be included in the MAC PDU carrying the RAR, such as in the header of the MAC PDU, or in a subheader of the MAC subPDU in the MAC PDU.

To sum up, a network device may send an RAR to a UE. At least one first bit in the RAR may be configured to indicate information on a number of repetitions of the Msg3 PUSCH. The network device may indicate whether the at least one first bit indicates information on the number of repetitions of the Msg3 PUSCH by means of first information associated with the RAR. In other words, the network device may indicate whether the at least one first bit includes information on the number of repetitions of the Msg3 PUSCH. Accordingly, the UE may receive the RAR from the network device, and determine whether the at least one first bit indicates the information on the number of repetitions of the Msg3 PUSCH according to the first information associated with the RAR. In other words, the UE may determine whether the at least one first bit includes the information on the number of repetitions of the Msg3 PUSCH. Then, the UE may perform the transmission of the Msg3 PUSCH according to a transmission mode of the Msg3 PUSCH as indicated by the network device, thereby ensuring that both the network device and the UE have the same understanding of the transmission mode of the Msg3 PUSCH.

It should be noted that in the embodiments of the disclosure, the UE may determine, according to the first information, whether at least one first bit in the RAR indicates the information on the number of the repetitions of the Msg3 PUSCH. The information on the number of the repetitions of the Msg3 PUSCH may refer to information on a number of repetitions of initial transmission of the Msg3 PUSCH. In some other embodiments, the network device may schedule the repetition of the Msg3 PUSCH by using the DCI. The network device may also indicate the information on the number of the repetitions of the Msg3 PUSCH. In this case, the DCI may include at least one third bit. The at least one third bit may be configured to indicate the information on the number of the repetitions of the Msg3 PUSCH. Further, the network device may indicate, to the UE, through at least one fourth bit in the DCI and/or the TC-RNTI corresponding to the PDCCH carrying the DCI, whether the at least one third bit indicates the information on the number of the repetitions of the Msg3 PUSCH, or whether the network device schedules the repetitions of the Msg3 PUSCH.

It should be noted that reference can be made to the specific implementations of the first bit and the second bit in the above embodiments for the specific implementations of the at least one third bit and the at least one fourth bit, which would not be repeated here for brevity.

It should be noted that reference can be made to the specific implementations of the RA-RNTI corresponding to the PDCCH carrying the RAR in the above embodiments for the specific implementations of the TC-RNTI corresponding to the PDCCH carrying the DCI, which would not be repeated here for brevity.

As an example, the at least one third bit may include at least one bit in at least one information field in the DCI. The at least one fourth bit may include at least one bit in at least one information field in the DCI. The at least one fourth bit is different from the at least one third bit.

Optionally, the at least one third bit and the at least one fourth bit are carried in a same information field in the DCI. For example, the at least one third bit and the at least one fourth bit are carried in the TDRA field in the UL grant information in the DCI.

Optionally, the at least one third bit and the at least one fourth bit are carried in different information fields in the DCI. For example, the at least one third bit is carried in the TDRA field in the UL grant information in the DCI, and the at least one fourth bit is carried in the information field other than the TDRA field in the UL grant information in the DCI.

As an example, the network device may generate, according to the first identification information, a TC-RNTI scrambling the PDCCH carrying the DCI. Reference can be made to the above-mentioned related implementations for the specific implementations of the first identification information, which would not be repeated here for brevity. Based on the implementation, the PDCCH scheduling the RAR for the repetitions of the Msg3 PUSCH and the PDCCH not scheduling the RAR for the repetitions of the Msg3 PUSCH may correspond to different TC-RNTIs. Therefore, the UE requesting the repetitions of the Msg3 PUSCH may determine whether the at least one third bit in the DCI indicates the information on the number of the repetitions of the Msg3 PUSCH.

Method embodiments of the disclosure have been elaborated with reference to FIG. 2 to FIG. 4. Apparatus embodiments of the disclosure are elaborated below with reference to FIG. 5 to FIG. 9. It should be noted that the apparatus embodiments correspond to the method embodiments, and references can be made to the method embodiments for similar description.

Figure 5:
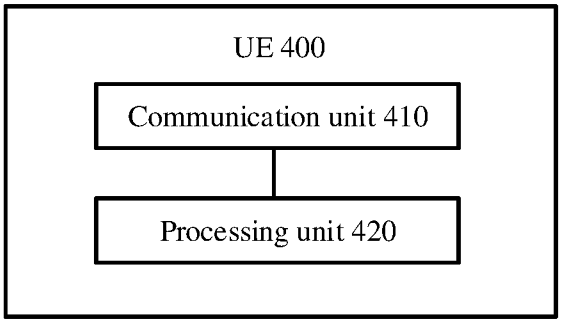
FIG. 5 is a block diagram of a UE according to an embodiment of the disclosure.

FIG. 5 is a block diagram of a UE 400 according to embodiments of the disclosure. As shown in FIG. 5, the UE 400 may include a communication unit and a processing unit.

The communication unit 410 is configured to receive an RAR from a network device. The RAR includes at least one first bit. The at least one first bit can be configured to indicate a number of repetitions of a PUSCH, and the PUSCH is configured to carry a third message during a random access procedure.

The processing unit 420 is configured to determine whether the at least one first bit is configured to indicate the number of the repetitions of the PUSCH according to first information. The first information is associated with the RAR.

In some embodiments of the disclosure, the first information includes at least one second bit in the RAR. The at least one second bit differs from the at least one first bit.

In some embodiments of the disclosure, the at least one second bit and the at least one first bit are carried in a same information field in the RAR.

In some embodiments of the disclosure, the at least one second bit and the at least one first bit are carried in different information fields in the RAR.

In some embodiments of the disclosure, both the at least one second bit and the at least one first bit are carried in uplink grant information of the RAR.

In some embodiments of the disclosure, the first information includes a RA-RNTI corresponding to a PDCCH scheduling the RAR.

In some embodiments of the disclosure, the RA-RNTI corresponding to the PDCCH scheduling the RAR is determined according to first identification information, and the first identification information is related to a transmission mode of the PUSCH determined by the network device.

In some embodiments of the disclosure, the transmission mode of the PUSCH includes the PUSCH transmission with repetition and the PUSCH transmission without repetition.

In some embodiments of the disclosure, the processing unit 420 is further configured to perform the following operation.

The RA-RNTI corresponding to the PDCCH scheduling the RAR is determined according to the following formula.

$$\text{RA-RNTI}=1+s\_id+14\times t\_id+14\times 80\times f\_id+14\times 80\times 8\times ul\_carrier\_id+14\times 80\times 8\times 2\times Q.$$

Q is the first identification information.

s_id is an index of a first OFDM symbol in a PRACH resource.

t_id is an index of a first slot in the PRACH resource.

f_id is an index of the PRACH resource in frequency domain.

ul_carrier_id is an uplink carrier where the PRACH resource is located.

In some embodiments of the disclosure, Q is not equal to 0; or Q is not equal to 0 or 1.

In some embodiments of the disclosure, the first information includes information in a PDCCH scheduling the RAR.

In some embodiments of the disclosure, the first information includes at least one reserved bit in the PDCCH scheduling the RAR.

In some embodiments of the disclosure, the first information includes multiple reserved bit sets. Each reserved bit set of the multiple reserved bit sets includes at least one reserved bit. Each reserved bit set of the multiple reserved bit sets corresponds to a respective preamble or a respective preamble set, and a value of each reserved bit set of the multiple reserved bit sets is configured to indicate whether at least one first bit in an RAR corresponding to the random access preamble or the random access preamble set that corresponds to the reserved bit set is configured to indicate the number of the repetitions of the PUSCH.

In some embodiments of the disclosure, a respective random access preamble or a respective random access preamble set corresponding to each reserved bit set of the multiple reserved bit sets is configured to request the repetitions of the PUSCH.

In some embodiments of the disclosure, the processing unit 420 is further configured to:

Indicate whether the UE requests the repetitions of the PUSCH to the network device through a first message. The first message is a first message during the random access procedure.

In some embodiments of the disclosure, the processing unit 420 is further configured to:

Indicate, through at least one of a random access preamble, an initial uplink BWP on which the first message is transmitted, or a PRACH resource on which the first message is transmitted, whether the UE requests the repetitions of the PUSCH to the network device.

In some embodiments of the disclosure, the first information includes information in a MAC PDU carrying the RAR.

In some embodiments of the disclosure, the information in the MAC PDU carrying the RAR includes at least one of information in a header of the MAC PDU or information in a subheader in a MAC subPDU of the MAC PDU.

In some embodiments of the disclosure, the at least one first bit is carried in an information field of TDRA in the uplink grant information of the RAR.

In some embodiments of the disclosure, the processing unit 420 is further configured to perform the following operations.

In response to determining that the at least one first bit is configured to indicate the number of the repetitions of the PUSCH, the number of the repetitions of the PUSCH is determined according to a value of the at least one first bit.

Alternatively, in response to determining that the at least one first bit is not configured to indicate the number of the repetitions of the PUSCH, TDRA information of the PUSCH is determined according to a value of the information field of the TDRA.

Optionally, in some embodiments, the communication unit may be a communication interface or a transceiver, or an input/output interface of a communication chip or a system-on-chip. The processing unit may be one or more processors.

Understandably, the UE 400 according to embodiments of the disclosure may correspond to the UE in the method embodiments of the disclosure. The above-mentioned operations and/or functions and other operations and/or functions of various units of the UE 400 are intended to implement the corresponding flow of the UE in the method 200 shown in FIG. 2, which would not be repeated here for brevity.

Figure 6:
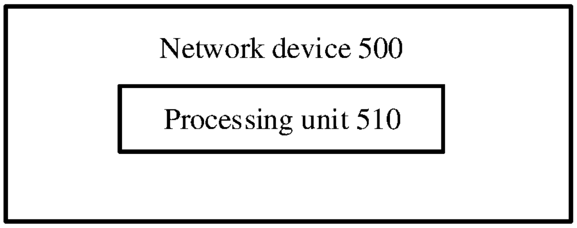
FIG. 6 is a block diagram of a network device according to an embodiment of the disclosure.

FIG. 6 is a block diagram of a network device according to an embodiment of the disclosure. The network device 500 in FIG. 6 includes a processing unit 510.

The processing unit 510 is configured to indicate whether at least one first bit in an RAR indicates a number of repetitions of a PUSCH to a UE through first information. The first information is associated with the RAR, the at least one first bit can be configured to indicate the number of the repetitions of the PUSCH, and the PUSCH is configured to carry a third message during a random access procedure.

In some embodiments of the disclosure, the first information includes at least one second bit in the RAR. The at least one second bit differs from the at least one first bit.

In some embodiments of the disclosure, the at least one second bit and the at least one first bit are carried in a same information field in the RAR.

In some embodiments of the disclosure, the at least one second bit and the at least one first bit are carried in different information fields in the RAR.

In some embodiments of the disclosure, both the at least one second bit and the at least one first bit are carried in uplink grant information of the RAR.

In some embodiments of the disclosure, the first information includes a RA-RNTI corresponding to a PDCCH scheduling the RAR.

In some embodiments of the disclosure, the RA-RNTI corresponding to the PDCCH scheduling the RAR is determined according to first identification information, and the first identification information is related to a transmission mode of the PUSCH determined by the network device.

In some embodiments of the disclosure, the transmission mode of the PUSCH includes the PUSCH transmission with repetition and the PUSCH transmission without repetition.

In some embodiments of the disclosure, the processing unit 510 is further configured to performing the following operation.

The RA-RNTI corresponding to the PDCCH scheduling the RAR is determined according to the following formula.

$$\text{RA-RNTI}=1+s\_id+14\times t\_id+14\times 80\times f\_id+14\times 80\times 8\times ul\_carrier\_id+14\times 80\times 8\times 2\times Q.$$

Q is the first identification information.

s_id is an index of a first OFDM symbol in a PRACH resource.

t_id is an index of a first slot in the PRACH resource.

f_id is an index of the PRACH resource in frequency domain.

ul_carrier_id is an uplink carrier where the PRACH resource is located.

In some embodiments of the disclosure, Q is not equal to 0; or Q is not equal to 0 or 1.

In some embodiments of the disclosure, the first information includes information in a PDCCH scheduling the RAR.

In some embodiments of the disclosure, the first information includes at least one reserved bit in the PDCCH scheduling the RAR.

In some embodiments of the disclosure, the first information includes multiple reserved bit sets. Each reserved bit set of the multiple reserved bit sets may include at least one reserved bit. Each reserved bit set of the multiple reserved bit sets corresponds to a respective preamble or a respective preamble set, and a value of each reserved bit set of the multiple reserved bit sets is configured to indicate whether at least one first bit in an RAR corresponding to the random access preamble or the random access preamble set that corresponds to the reserved bit set is configured to indicate the number of the repetitions of the PUSCH.

In some embodiments of the disclosure, a respective random access preamble or a respective random access preamble set corresponding to each reserved bit set of the multiple reserved bit sets is configured to request the repetitions of the PUSCH.

In some embodiments of the disclosure, the processing unit 510 is further configured to perform the following operation.

Whether the UE requests the repetitions of the PUSCH is determined according to a first message. The first message is a first message during the random access procedure.

In some embodiments of the disclosure, the processing unit 510 is further configured to:

Determine whether the UE requests the repetitions of the PUSCH at least one of a random access preamble, an initial uplink Band Width Part (BWP) on which the first message is transmitted, or a Physical Random Access Channel (PRACH) resource on which the first message is transmitted.

In some embodiments of the disclosure, the first information includes information in a MAC PDU carrying the RAR.

In some embodiments of the disclosure, the information in the MAC PDU carrying the RAR includes at least one of information in a header of the MAC PDU or information in a subheader in a MAC subPDU of the MAC PDU.

In some embodiments of the disclosure, the at least one first bit is carried in an information field of TDRA in the uplink grant information of the RAR.

In some embodiments of the disclosure, the at least one first bit can be configured to indicate a number of repetitions of initial transmission of the PUSCH.

Optionally, in some embodiments, the communication unit may be a communication interface or a transceiver, or an input/output interface of a communication chip or a system-on-chip. The processing unit may be one or more processors.

Understandably, the network device 500 according to embodiments of the disclosure may correspond to the network device in the method embodiments of the disclosure. The above-mentioned operations and/or functions and other operations and/or functions of various units of the network device 500 are intended to implement the corresponding flow of the network device in the method 200 shown in FIG. 2, which would not be repeated here for brevity.

Figure 7:
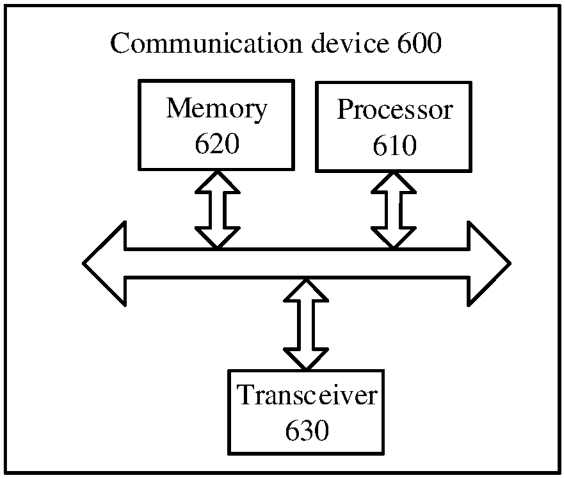
FIG. 7 is a block diagram of a communication device according to an embodiment of the disclosure.

FIG. 7 is a block diagram of a communication device 600 according to an embodiment of the disclosure. The communication device 600 of FIG. 7 includes a processor 610. The processor 610 is configured to invoke and run a computer program from a memory to implement the methods in the embodiments of the disclosure.

Optionally, as shown in FIG. 7, the communication device 600 may further include a memory 620. The processor 610 is configured to invoke and run the computer program from the memory 620 to implement the methods in the embodiments of the disclosure.

The memory 620 may be a standalone device separate from the processor 610 or may be integrated into the processor 610.

Optionally, as shown in FIG. 7, the communication device 600 may further include a transceiver 630. The processor 610 may control the transceiver 630 to communicate with other devices. Specifically, the transceiver 630 may transmit information or data to other devices, or may receive information or data from other devices.

The transceiver 630 may include a transmitter and a receiver. The transceiver 630 may further include one or more antennas.

Optionally, the communication device 600 may be the network device according to the embodiments of the disclosure, and the communication device 600 may implement the corresponding flow implemented by the network device in various methods according to the embodiments of the disclosure, which would not be repeated here for brevity.

Optionally, the communication device 600 may be the mobile terminal/UE according to the embodiments of the disclosure, and the communication device 600 may implement the corresponding flow implemented by the mobile terminal/UE in various methods according to the embodiments of the disclosure, which would not be repeated here for brevity.

Figure 8:
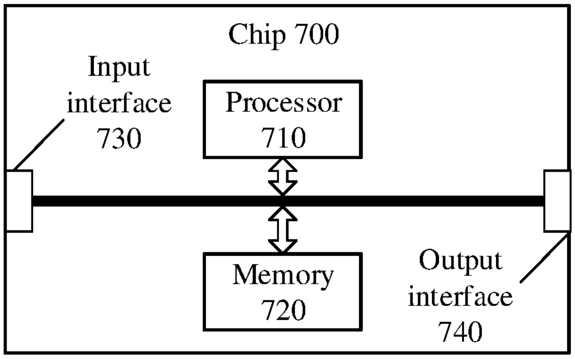
FIG. 8 is a block diagram of a chip according to an embodiment of the disclosure.

FIG. 8 is a diagram of a structure of a chip according to an embodiment of the disclosure. The chip 700 shown in FIG. 8 includes a processor 710. The processor 710 is configured to invoke and run a computer program from a memory to implement the methods in the embodiments of the disclosure.

Optionally, as shown in FIG. 8, the chip 700 may further include a memory 720. The processor 710 is configured to invoke and run the computer program from the memory 720 to implement the methods in the embodiments of the disclosure.

The memory 720 may be a standalone device separate from the processor 710, or may be integrated in the processor 710.

Optionally, the chip 700 may further include an input interface 730. The processor 710 may control the input interface 730 to communication with other devices or chips. Specifically, the processor 710 may control the input interface 730 to acquire information or data from other devices or chips.

Optionally, the chip 700 may further include an output interface 740. The processor 710 may control the output interface 740 to communication with other devices or chips. Specifically, the processor 710 may control the output interface 740 to output information or data to other devices or chips.

Optionally, the chip may be applied to the network device in the embodiments of the disclosure, and the chip may implement the corresponding flow implemented by the network device in various methods according to the embodiments of the disclosure, which would not be repeated here for brevity.

Optionally, the chip may be applied to the mobile terminal/UE in the embodiments of the disclosure, and the chip may implement the corresponding flow implemented by the mobile terminal/UE in various methods according to the embodiments of the disclosure, which would not be repeated here for brevity.

It should be noted that the chip mentioned in the embodiments of the disclosure may further be referred to as a system-level chip, a system chip, a chip system, a system-on-chip, etc.

Figure 9:
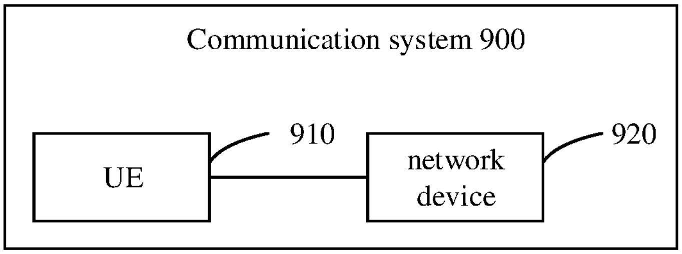
FIG. 9 is a block diagram of a communication system according to an embodiment of the disclosure.

FIG. 9 is a block diagram of a communication system 900 according to an embodiment of the disclosure. As shown in FIG. 9, the communication system 900 includes a UE 910 and a network device 920.

The UE 910 is configured to implement the corresponding functions implemented by the UE in the above methods, and the network device 920 is configured to implement the corresponding functions implemented by the network device in the above methods, which would not be repeated here for brevity.

It should be noted that the processor according to the embodiments of the disclosure may be an integrated circuit chip having the capability to process signals. In the implementation process, each step of the above method can be accomplished by an integrated logic circuit of hardware or an instruction in the form of software in the processor. The processor described above may be a general purpose processor, a Digital Signal Processor (DSP), an Application Specific Integrated Circuit (ASIC), a Field Programmable Gate Array (FPGA) or other programmable logic devices, a discrete gate or a transistor logic device, a discrete hardware component. The processor may implement or perform the methods, steps, and logical block diagrams disclosed in the embodiments of the present disclosure. The general purpose processor may be a microprocessor or any conventional processor or the like. The steps of the method disclosed in the embodiments of the present disclosure can be directly accomplished by the hardware decoding processor, or be accomplished by the combination of hardware and software modules in the decoding processor. The software module may be located in a mature storage medium in the art, such as a Random Access Memory (RAM), a flash memory, a Read Only Memory (ROM), a Programmable Read-Only Memory (PROM), an Electrically Erasable Programmable Read-Only Memory (EEPROM), a register, etc. The storage medium may be located in the memory. The processor may read the information in the memory and may implement the operations of the foregoing methods in combination with the hardware.

It can be appreciated that the memory in the embodiments of the disclosure may be volatile or non-volatile memory, or may include both volatile and non-volatile memory. The non-volatile memory may be a Read-Only Memory (ROM), a Programmable Read-Only Memory (PROM), a Erasable Programmable Read-Only Memory (EPROM) or a flash memory. The volatile memory may be a Random Access Memory (RAM) that functions as an external cache. By way of illustrative instead of restrictive description, many forms of RAMs may be available, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDR SDRAM), an Enhanced Synchronous Dynamic Random Access Memory (ESDRAM), a SynchLink Dynamic Random Access Memory (SLDRAM), and a Direct Rambus Random Access Memory (DR RAM). It should be noted that the memory of the methods and the system herein is intended to include, but is not limited to, these and any other memories of suitable types.

It should be understood that the memory as mentioned above is illustrative rather than restrictive. For example, the memory in the embodiments of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), or the like. That is, the memory in the embodiments of the disclosure is intended to include, but is not limited to, memories of these and any other proper types.

Embodiments of the disclosure further provide a computer-readable storage medium configured to store a computer program.

Optionally, the computer-readable storage medium may be applied to the network device in the embodiments of the disclosure, and the computer program may enable a computer to implement the flow implemented by the network device in various methods of the embodiments of the disclosure, which would not be repeated here for brevity.

Optionally, the computer-readable storage medium may be applied to the mobile terminal/UE in the embodiments of the disclosure, and the computer program may enable a computer to implement the flow implemented by the mobile terminal/UE in various methods of the embodiments of the disclosure, which would not be repeated here for brevity.

Embodiments of the disclosure further provide a computer program product including computer program instructions.

Optionally, the computer program product may be applied to the network device in the embodiments of the disclosure, and the computer program instructions may enable a computer to implement the flow implemented by the network device in various methods of the embodiments of the disclosure, which would not be repeated here for brevity.

Optionally, the computer program product may be applied to the mobile terminal/UE in the embodiments of the disclosure, and the computer program instructions may enable a computer to implement the flow implemented by the mobile terminal/UE in various methods of the embodiments of the disclosure, which would not be repeated here for brevity.

Embodiments of the disclosure further provide a computer program.

Optionally, the computer program may be applied to the network device in the embodiments of the disclosure, and when the computer program is run on a computer, the computer program may enable the computer to implement the flow implemented by the network device in various methods of the embodiments of the disclosure, which would not be repeated here for brevity.

Optionally, the computer program may be applied to the mobile terminal/UE in the embodiments of the disclosure, and when the computer program is run on a computer, the computer program may enable the computer to implement the flow implemented by the mobile terminal/UE in various methods of the embodiments of the disclosure, which would not be repeated here for brevity.

Those skilled in the art may realize that the units and algorithm operations of the embodiments described in conjunction with the disclosed embodiments can be implemented by electronic hardware, or by a combination of computer software and electronic hardware. Whether these functions are implemented by hardware or by software may depend on the specific application and design constraints of the technical solution. Those skilled may use different methods to implement the described functions according to the specific application. Such implementation however should not be deemed going beyond the scope of the technical solutions of the disclosure.

Those skilled in the art can clearly understand that for the convenience and conciseness of the description, the specific working processes of the system, device, and unit described above can refer to the corresponding processes in the aforementioned method embodiments, which would not be repeated here.

In the embodiments of the present disclosure, it should be understood that the disclosed system, device and method may be implemented in other ways. For example, the device embodiments described above are merely illustrative. For example, the partitioning of the unit is merely a partitioning of logical function. Other partitioning mode may be adopted in practical implementation. For example, multiple units or components may be combined or integrated into another system, or some features may be ignored or not executed. In addition, the coupling, the direct coupling or the communication connection shown or discussed may be accomplished through some interfaces, and the indirect coupling or communication connection of devices or units may be electrical, mechanical or in other forms.

The units described above as separate components may or may not be physically separate, and the components displayed as units may or may not be a physical unit, that is, they may be located in one place or distributed over multiple network units. Some or all of the units can be selected according to practical needs to achieve the purpose of the embodiment.

In addition, in the embodiments of the present disclosure, various function units may be integrated into one processing unit, or each unit may be separately used as one unit, or two or more units may be integrated into one unit.

When realized in the form of software function modules and sold or used as a stand-alone product, the functions can also be stored in a computer-readable storage medium. Based on such an understanding, the technical solutions of the embodiments of the present disclosure, or the contribution of the technical solutions to the related art, can be embodied in the form of a software product. The software product can be stored in a storage medium, and may include multiple instructions to enable a computer device (which may be a personal computer, a server, a network device, etc.) to perform all or part of the methods described in the embodiments of the present disclosure. The storage medium may include various media that may store program codes, such as a U disk, a mobile hard disk, a Read-Only Memory (ROM), a Random Access Memory (RAM), a magnetic disk, an optical disc, etc.

The foregoing are only specific embodiments of the disclosure, however, the scope of protection of the disclosure is not limited thereto. Variation and substitution which may be readily conceived by those skilled in the art within the technical scope disclosed in the disclosure should fall within the scope of protection of the disclosure. Therefore, the scope of protection of the disclosure should conform to the scope of protection of the claims.

The invention claimed is:

1. A method for radio communication, comprising:

receiving, by a User Equipment, a Random Access Response (RAR) from a network device, wherein the RAR comprises at least one first bit, the at least one first bit can be configured to indicate a number of repetitions of a Physical Uplink Shared Channel (PUSCH), and the PUSCH is configured to carry a third message during a random access procedure; and determining, by the UE, whether the at least one first bit is configured to indicate the number of the repetitions of the PUSCH according to first information, wherein the first information is associated with the RAR, and the at least one first bit is a plurality of bits in a Modulation and Coding Scheme (MCS) field in the RAR, wherein the method further comprises:

indicating, by the UE whether the UE requests the repetitions of the PUSCH to the network device through a first message, wherein the first message is a first message during the random access procedure.

2. The method of claim 1, wherein the first information comprises at least one second bit in the RAR, and the at least one second bit differs from the at least one first bit.

3. The method of claim 1, wherein the first information comprises a Random Access Radio Network Temporary Identity (RA-RNTI) corresponding to a Physical Downlink Control Channel (PDCCH) scheduling the RAR, wherein the RA-RNTI corresponding to the PDCCH scheduling the RAR is determined according to first identification information, and the first identification information is related to a transmission mode of the PUSCH determined by the network device, wherein the transmission mode of the PUSCH comprises PUSCH transmission with repetition and PUSCH transmission without repetition.

4. The method of claim 3, further comprising:

determining, by the UE, the RA-RNTI corresponding to the PDCCH scheduling the RAR according to following formula:

$$\text{RA-RNTI}=1+s\_\text{id}+14\times t\_\text{id}+14\times 80\times f\_\text{id}+14\times 80\times 8\times \text{ul\_carrier\_id}+14\times 80\times 8\times 2\times Q,$$

wherein Q is the first identification information, s_id is an index of a first Orthogonal Frequency Division Multiplexing (OFDM) symbol in a Physical Random Access Channel (PRACH) resource, t_id is an index of a first slot in the PRACH resource, f_id is an index of the PRACH resource in frequency domain, and ul_carrier_id is an uplink carrier where the PRACH resource is located, wherein Q is not equal to 0; or Q is not equal to 0 or 1.

5. The method of claim 1, wherein the first information comprises information in a Physical Downlink Control Channel (PDCCH) scheduling the RAR, wherein the first information comprises at least one reserved bit in the PDCCH scheduling the RAR.

6. The method of claim 5, wherein the first information comprises a plurality of reserved bit sets, each reserved bit set of the plurality of reserved bit sets comprises at least one reserved bit, each reserved bit set of the plurality of reserved bit sets corresponds to a respective random access preamble or a respective random access preamble set, a value of each reserved bit set of the plurality of reserved bit sets is configured to indicate whether at least one first bit in an RAR corresponding to the random access preamble or the random access preamble set that corresponds to the reserved bit set is configured to indicate the number of the repetitions of the PUSCH.

7. The method of claim 1, wherein the at least one first bit is carried in an information field of time domain resource assignment (TDRA) in uplink grant information of the RAR, wherein the method further comprises:

in response to determining that the at least one first bit is configured to indicate the number of the repetitions of the PUSCH, determining the number of the repetitions of the PUSCH according to a value of the at least one first bit; or in response to determining that the at least one first bit is not configured to indicate the number of the repetitions of the PUSCH, determining TDRA information of the PUSCH according to a value of the information field of the TDRA.

8. The method of claim 1, wherein the first information comprises information in a Media Access Control Protocol Data Unit (MAC PDU) carrying the RAR, and wherein the information in the MAC PDU carrying the RAR comprises at least one of information in a header of the MAC PDU or information in a subheader in a MAC subPDU of the MAC PDU.

9. A User Equipment (UE), comprising a processor and a memory, wherein the memory is configured to store thereon a computer program, and the processor is configured to invoke and run the computer program stored in the memory to:

receive a Random Access Response (RAR) from a network device, wherein the RAR comprises at least one first bit, the at least one first bit can be configured to indicate a number of repetitions of a Physical Uplink Shared Channel (PUSCH), and the PUSCH is configured to carry a third message during a random access procedure; and determine whether the at least one first bit is configured to indicate the number of the repetitions of the PUSCH according to first information, wherein the first information is associated with the RAR, and the at least one first bit is a plurality of bits in a Modulation and Coding Scheme (MCS) field in the RAR, wherein the processor is further configured to invoke and run the computer program stored in the memory to:

indicate whether the UE requests the repetitions of the PUSCH to the network device through a first message, wherein the first message is a first message during the random access procedure.

10. The UE of claim 9, wherein the first information comprises at least one second bit in the RAR, and the at least one second bit differs from the at least one first bit.

11. The UE of claim 9, wherein the first information comprises a Random Access Radio Network Temporary Identity (RA-RNTI) corresponding to a Physical Downlink Control Channel (PDCCH) scheduling the RAR, wherein the RA-RNTI corresponding to the PDCCH scheduling the RAR is determined according to first identification information, and the first identification information is related to a transmission mode of the PUSCH determined by the network device, wherein the transmission mode of the PUSCH comprises PUSCH transmission with repetition and PUSCH transmission without repetition.

12. The UE of claim 11, wherein the processor is further configured to:

determine the RA-RNTI corresponding to the PDCCH scheduling the RAR according to following formula:

$$RA\text{-}RNTI=1+s\_id+14\times t\_id+14\times 80\times f\_id+14\times 80\times 8\times ul\_carrier\_id+14\times 80\times 8\times 2\times Q,$$

wherein Q is the first identification information, s_id is an index of a first Orthogonal Frequency Division Multiplexing (OFDM) symbol in a Physical Random Access Channel (PRACH) resource, t_id is an index of a first slot in the PRACH resource, f_id is an index of the PRACH resource in frequency domain, and ul_carrier_id is an uplink carrier where the PRACH resource is located, wherein Q is not equal to 0; or Q is not equal to 0 or 1.

13. The UE of claim 9, wherein the first information comprises information in a Physical Downlink Control Channel (PDCCH) scheduling the RAR, wherein the first information comprises at least one reserved bit in the PDCCH scheduling the RAR.

14. The UE of claim 13, wherein the first information comprises a plurality of reserved bit sets, each reserved bit set of the plurality of reserved bit sets comprises at least one reserved bit, each reserved bit set of the plurality of reserved bit sets corresponds to a respective random access preamble or a respective random access preamble set, a value of each reserved bit set of the plurality of reserved bit sets is configured to indicate whether at least one first bit in an RAR corresponding to the random access preamble or the random access preamble set that corresponds to the reserved bit set is configured to indicate the number of the repetitions of the PUSCH.

15. A network device, comprising a processor and a memory, wherein the memory is configured to store thereon a computer program, and the processor is configured to invoke and run the computer program stored in the memory to:

indicate whether at least one first bit in a Random Access Response (RAR) indicates a number of repetitions of a Physical Uplink Shared Channel (PUSCH) to a User Equipment (UE) through first information, wherein the first information is associated with the RAR, the at least one first bit can be configured to indicate the number of the repetitions of the PUSCH, the PUSCH is configured to carry a third message during a random access procedure, and the at least one first bit is a plurality of bits in a Modulation and Coding Scheme (MCS) field in the RAR, wherein the processor is further configured to invoke and run the computer program stored in the memory to:

determine whether the UE requests the repetitions of the PUSCH according to a first message, wherein the first message is a first message during the random access procedure.

16. The network device of claim 15, wherein the first information comprises at least one second bit in the RAR, and the at least one second bit differs from the at least one first bit.

17. The network device of claim 16, wherein the at least one second bit and the at least one first bit are carried in different information fields in the RAR.

18. The network device of claim 15, wherein the first information comprises information in a Media Access Control Protocol Data Unit (MAC PDU) carrying the RAR.

19. The network device of claim 18, wherein the information in the MAC PDU carrying the RAR comprises at least one of information in a header of the MAC PDU or information in a subheader in a MAC subPDU of the MAC PDU.

* * * * *